(12) United States Patent
Wang et al.

(10) Patent No.: US 10,492,259 B2
(45) Date of Patent: Nov. 26, 2019

(54) DIMMABLE LED DRIVER AND DIMMING METHOD

(71) Applicant: Silergy Semiconductor Technology (Hangzhou) LTD, Hangzhou, ZheJiang Province (CN)

(72) Inventors: Longqi Wang, Hangzhou (CN); Jianxin Wang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 16/120,564

(22) Filed: Sep. 4, 2018

(65) Prior Publication Data
US 2019/0104589 A1    Apr. 4, 2019

(30) Foreign Application Priority Data
Sep. 30, 2017    (CN) .......................... 2017 1 0938773

(51) Int. Cl.
| | | |
|---|---|---|
| H05B 33/08 | (2006.01) | |
| H02M 3/335 | (2006.01) | |
| H02M 1/00 | (2006.01) | |

(52) U.S. Cl.
CPC ..... *H05B 33/0845* (2013.01); *H05B 33/0815* (2013.01); *H02M 3/33507* (2013.01); *H02M 2001/0009* (2013.01); *H02M 2001/0025* (2013.01)

(58) Field of Classification Search
CPC ............ H05B 33/0842; H05B 33/0845; H05B 33/0809; H05B 33/0815; H05B 37/02; H05B 37/029; H05B 37/0281; H02M 3/33507; H02M 2001/0025; H02M 2001/009
See application file for complete search history.

(56) References Cited

U.S. PATENT DOCUMENTS

| | | | | |
|---|---|---|---|---|
| 5,381,074 A | * | 1/1995 | Rudzewicz | B60Q 3/85 315/77 |
| 8,614,551 B2 | | 12/2013 | Chen et al. | |
| 8,664,883 B2 | * | 3/2014 | Hiramatu | H05B 33/0815 315/291 |
| 8,829,802 B2 | * | 9/2014 | Wei | H05B 33/0845 315/224 |
| 8,975,820 B2 | * | 3/2015 | Seidmann | H05B 33/0845 315/149 |
| 9,078,327 B2 | * | 7/2015 | Livschitz | H05B 33/0848 |
| 9,119,254 B2 | * | 8/2015 | Lee | H05B 33/0815 |
| 9,120,578 B2 | * | 9/2015 | Martin | B64D 39/00 |
| 9,125,270 B2 | | 9/2015 | Liao et al. | |
| 9,578,706 B1 | | 2/2017 | Lai et al. | |
| 9,736,898 B2 | * | 8/2017 | Doshi | H05B 37/02 |
| 2006/0261754 A1 | * | 11/2006 | Lee | H05B 33/0815 315/291 |

(Continued)

FOREIGN PATENT DOCUMENTS

TW       201528871 A    7/2015

*Primary Examiner* — Haissa Philogene
(74) *Attorney, Agent, or Firm* — Michael C. Stephens, Jr.

(57) ABSTRACT

A dimming signal conversion method can include: converting a dimming voltage to a PWM signal; adjusting a corresponding relationship between the dimming voltage and a duty cycle of the PWM signal according to brightness requirements of a LED light source; and generating a drive current of an LED driver based on the corresponding relationship.

20 Claims, 10 Drawing Sheets

(56) References Cited

U.S. PATENT DOCUMENTS

| | | | |
|---|---|---|---|
| 2011/0163684 A1* | 7/2011 | Li | H05B 33/0815 |
| | | | 315/254 |
| 2014/0062322 A1 | 3/2014 | Yu et al. | |
| 2018/0054868 A1* | 2/2018 | Yan | H05B 33/0809 |

* cited by examiner

DIMMABLE LED DRIVER AND DIMMING METHOD

RELATED APPLICATIONS

This application claims the benefit of Chinese Patent Application No. 201710938773.8, filed on Sep. 30, 2017, which is incorporated herein by reference in its entirety.

FIELD OF THE INVENTION

The present invention generally relates to the field of power electronics, and more particularly to dimmable LED drivers and methods.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Light-emitting diode (LED) lighting is widely used in a wide variety of application fields, such as home, office, outside lighting, and stage lighting. Dimming technology may be utilized to adjust the brightness of the LED lighting, thereby expanding the application fields and practical experience of the LED lighting. In one approach, dimming can be realized by pulse-width modulation (PWM) control. According to an input voltage signal that is within a range, a PWM signal with a corresponding duty cycle can be converted, thereby changing a switching frequency of a switching converter or a duty cycle of a switch. Thus, a load current can be controlled, thereby adjusting of the brightness of the LED lighting. However, this dimming approach may not adjust an output current corresponding to a maximum duty cycle (e.g., full load current) or a range of a dimming voltage. If the expectation is to increase or decrease the full load current or adjust the range of the dimming voltage, a power stage circuit may need suitable modification.

Figure 1:
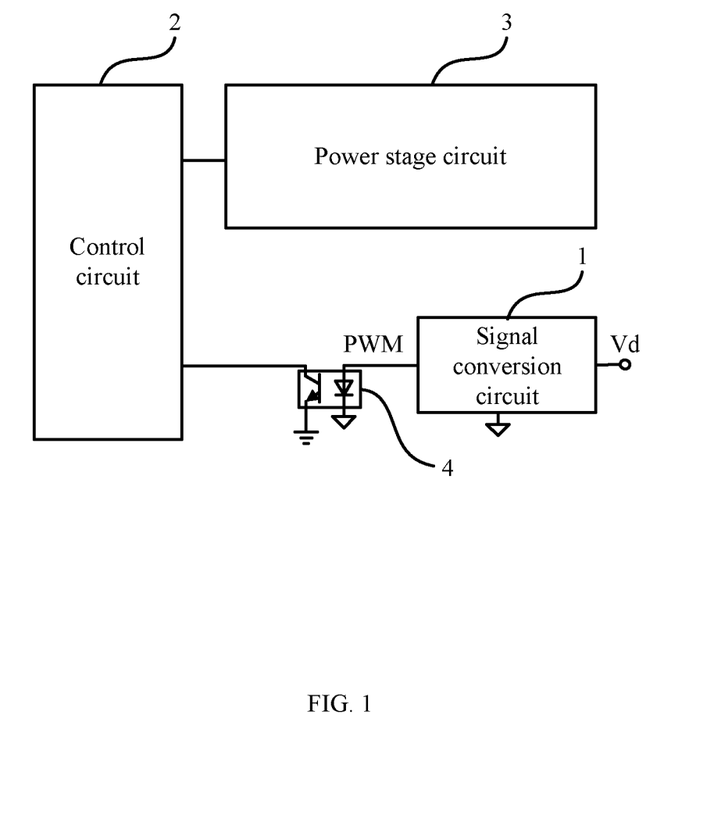
FIG. 1 is a schematic block diagram of an example dimmable LED driver.

Referring now to FIG. 1, shown is a circuit diagram of an example dimmable LED driver. In this example, the dimmable LED driver can include signal conversion circuit 1, control circuit 2 and power stage circuit 3. Signal conversion circuit 1 can convert dimming voltage Vd ranging from 0 to 10V to the PWM signal with a corresponding duty cycle, and then PWM signal PWM can be transmitted from optocoupler 4 to control circuit 2 in an isolated way. Control circuit 2 can adjust a current reference signal according to the PWM signal, and then can generate a control signal according to the current reference signal. The current reference signal can characterize an expect output of power stage circuit 3. Also, power stage circuit 3 can be controlled by control circuit 2 to generate a steady voltage or current.

Figure 2:
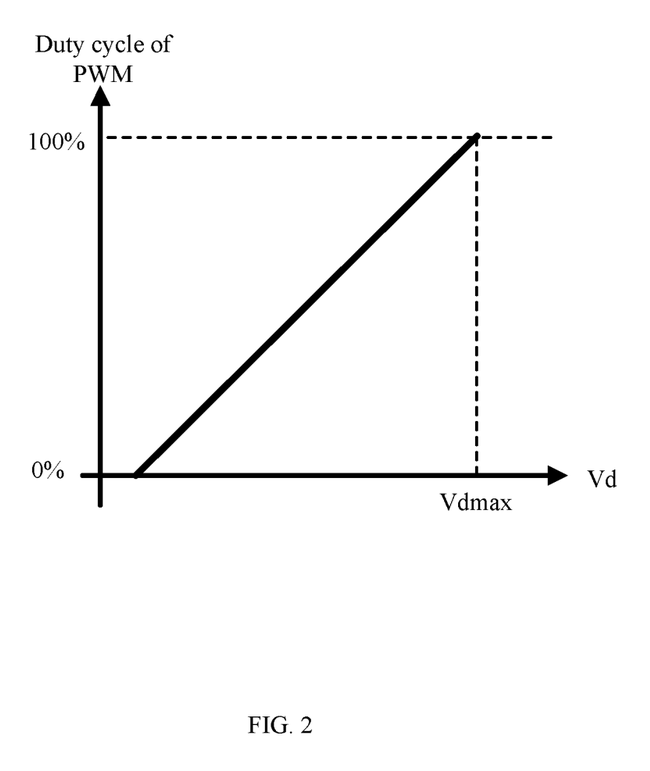
FIG. 2 is a schematic block diagram of an example signal relationship of a signal conversion circuit of FIG. 1.

Referring now to FIG. 2, shown is a schematic block diagram of an example signal relationship of a signal conversion circuit of FIG. 1. In this example, dimming voltage Vd and the duty cycle of the PWM signal are in a linear relationship. Generally, when dimming voltage Vd reaches maximum dimming voltage Vdmax (e.g., in the case of full range), the duty cycle can reach the maximum. Thus, power stage circuit 3 is in a full load condition, and the output current in the full load condition may satisfy: $I_O = k \cdot V_{ref}/R_{sen}$, where $I_O$ is the output current, k is a constant, and Vref is a reference signal. In order to change the output current or the range of the dimming voltage in the full load condition, resistor Rsen may be adjusted, since k and Vref cannot be changed. In one aspect, adjusting resistor Rsen can affect the normal operation of control circuit 2; in another aspect, parameters of power stage circuit 3 may be modified. Also, such adjustments/modifications are performed during the operation process, production efficiency may be affected.

In one embodiment, a dimming signal conversion method can include: (i) converting a dimming voltage to a PWM signal; (ii) adjusting a corresponding relationship between the dimming voltage and a duty cycle of the PWM signal according to brightness requirements of a LED light source;

and (iii) generating a drive current of an LED driver based on the corresponding relationship. In one embodiment, a signal conversion circuit can include: (i) a voltage conversion circuit configured to convert a dimming voltage to a conversion voltage; (ii) a PWM signal generating circuit configured to receive the conversion voltage, and to generate a PWM signal; and (iii) where a corresponding relationship between the dimming voltage and the conversion voltage is adjustable according to brightness requirements of an LED light source, in order to generate a drive current of the LED driver.

Figure 3:
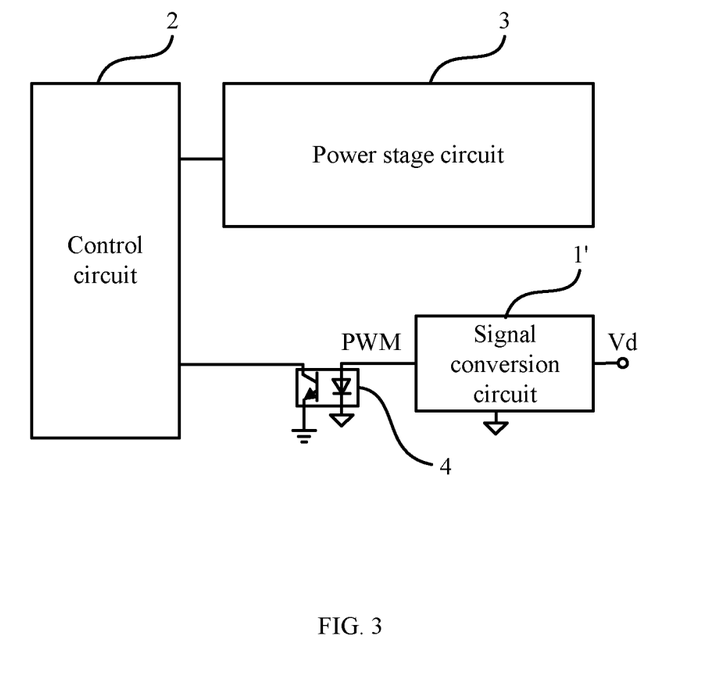
FIG. 3 is a schematic block diagram of an example dimmable LED driver, in accordance with embodiments of the present invention.

Referring now to FIG. 3, shown is a schematic block diagram of an example dimmable LED driver, in accordance with embodiments of the present invention. In this example, the dimmable LED driver can include signal conversion circuit 1', control circuit 2, power stage circuit 3, and optocoupler 4. Signal conversion circuit 1' can convert dimming voltage Vd to the corresponding PWM signal. Then, the PWM signal can be transmitted from optocoupler 4 to control circuit 2. Control circuit 2 can adjust the current reference signal according to PWM signal PWM, and may generate a control signal according to the current reference signal. The current reference signal can characterize the expect output of power stage circuit 3. Also, power stage circuit 3 can be controlled by control circuit 2 to generate a steady voltage or current. In this example, signal conversion circuit 1' can adjust the corresponding relationship (e.g., a linear relationship) between dimming voltage Vd and the duty cycle of the PWM signal, such that the range of dimming voltage Vd or the maximum duty cycle of the PWM signal is adjustable.

In this particular example, the maximum duty cycle or the range of dimming voltage Vd can be adjusted by adjusting the corresponding relationship between dimming voltage Vd and the duty cycle of the PWM signal. Consequently, without modifying the parameters or devices of power stage circuit 3, the range of the duty cycle can be fixed when the expected range of the dimming voltage is adjustable, such that the range of the dimming voltage can be adjustable. When the expected range of the dimming voltage is fixed, the range of the duty cycle can be adjustable, such that the range of the output current of the LED driver is adjustable.

Figure 4:
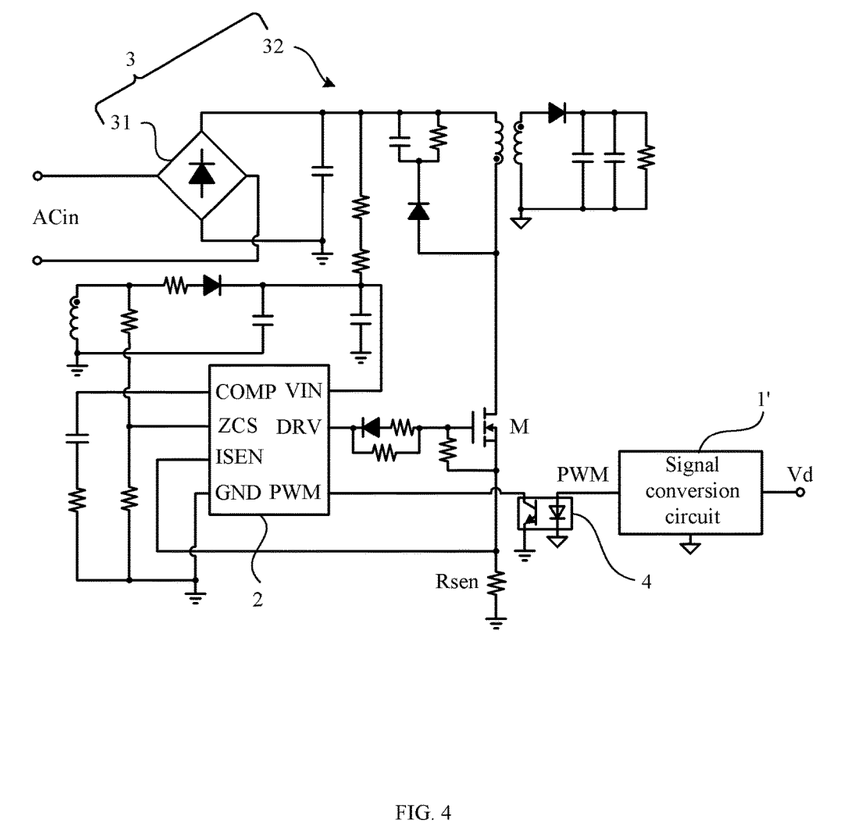
FIG. 4 is a schematic block diagram of another example dimmable LED driver, in accordance with embodiments of the present invention.

Referring now to FIG. 4, shown is a schematic block diagram of another example dimmable LED driver, in accordance with embodiments of the present invention. In this particular example, the dimmable LED driver can include signal conversion circuit 1', control circuit 2, power stage circuit 3, and optocoupler 4. Signal conversion circuit 1' can convert dimming voltage Vd to the corresponding PWM signal, which can be transmitted from optocoupler 4 to control circuit 2. Power stage circuit 3 can include rectifier bridge 31 and flyback converter 32 with primary side control. AC power ACin can be rectified to DC power by rectifier bridge 31, and then DC power may be provided to flyback converter 32. Also, transistor M in flyback converter 32 with primary side control can be turned on and off in response to a switch control signal that is generated by control circuit 2, in order to control an average current flowing through the primary winding, thereby controlling the output current. Control circuit 2 can control power stage circuit 3 to generate a constant output current according to the primary current, a signal characterizing an inductor current, and the PWM signal. The primary current may be sampled by resistor Rsen, and the signal characterizing the inductor current can be sampled by the auxiliary winding (e.g., coupled to ZCS port).

One skilled in the art will recognize that power stage circuit 3 can be replaced by other switching converter types, such as a switching converter with a boost type, a buck type or a buck-boost type topology, as long as it can adjust the output current by controlling the duty cycle of the power switch or the switching frequency of the switching converter. Also, optocoupler 4 may be omitted when such isolation is not required. In other implementations, control circuit 2 can also control the power switch based on other feedback signals. In this particular example, signal conversion circuit 1' can adjust the corresponding relationship between dimming voltage Vd and the duty cycle of the PWM signal, such that the range of the dimming voltage can be adjustable. In this example, the corresponding relationship is a linear relationship; that is, signal conversion circuit 1' can adjust the ratio of dimming voltage Vd and the duty cycle of the PWM signal.

Figure 5:
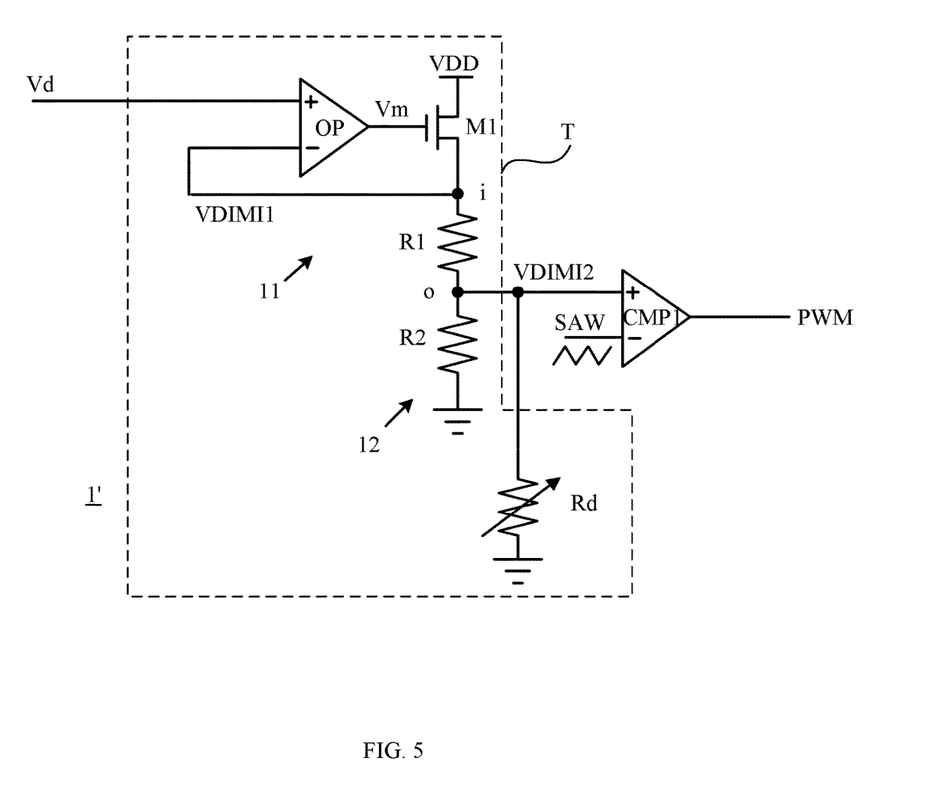
FIG. 5 is a schematic block diagram of an example signal conversion circuit, in accordance with embodiments of the present invention.

Referring now to FIG. 5, shown is a schematic block diagram of an example signal conversion circuit, in accordance with embodiments of the present invention. In this example, signal conversion circuit 1' can include voltage conversion circuit T and a PWM signal generation circuit. Voltage conversion circuit T may receive dimming voltage Vd, and generate conversion voltage VDIMI2. Also, voltage conversion circuit T can adjust the ratio of conversion voltage VDIMI2 and dimming voltage Vd.

In this particular example, voltage conversion circuit T can include voltage following circuit 11 and an adjustment circuit. Voltage following circuit 11 can keep voltage VDIMI1 at voltage dividing input terminal "i" proportional to dimming voltage Vd (e.g., dimming signal). For example, voltage following circuit 11 can receive dimming voltage Vd, and may keep voltage VDIMI1 at voltage dividing input terminal "i" proportional to dimming voltage Vd. The adjustment circuit coupled to voltage dividing input terminal "i" can generate conversion voltage VDIMI2 at voltage dividing output terminal "o." Also, adjustment circuit can include resistor divider network 12, which can include adjustable resistor Rd to adjust the voltage division ratio of resistor divider network 12. The voltage division ratio may refer to the ratio of voltage VDIMI2 at voltage dividing output terminal "o" (e.g., conversion voltage) to voltage VDIMI1 at voltage dividing input terminal "i." In addition, PWM signal generation circuit P can include comparator CMP1. An inverting input terminal of comparator CMP1 can receive sawtooth signal SAW, a non-inverting input terminal of comparator CMP1 can connect to voltage dividing output terminal "o," and an output terminal of comparator CMP1 may generate the PWM signal.

Voltage VDIMI1 can be at a fixed ratio (e.g., equal) to dimming voltage Vd, and the voltage division ratio of conversion voltage VDIMI2 and voltage VDIMI1 may be adjustable, such that the ratio of conversion voltage VDIMI2 to dimming voltage Vd is adjustable. Further, sawtooth signal SAW may be unchanged. Thus, the ratio of conversion voltage VDIMI2 that can generate the reference of PWM signal to dimming voltage Vd may be be adjusted by adjusting the voltage division ratio of resistor divider network 12, such that the ratio of dimming voltage Vd to the duty cycle of PWM signal PWM can also be adjusted. Moreover, when the range of the duty cycle is fixed (e.g., the maximum duty cycle is fixed), the range of dimming voltage Vd can be adjustable by adjusting the voltage division ratio of resistor divider network 12, thereby acquiring the PWM signal with the maximum duty cycle according to the expected dimming voltage.

For example, voltage following circuit 11 can include transistor M1 and operational amplifier OP. Transistor M1 coupled between a pull-up voltage terminal VDD and voltage dividing input terminal "i" can control the current flowing to voltage dividing input terminal "i" in response to voltage Vm of the control terminal. That is, transistor M1 can operate in a linear region under the control of voltage Vm of the control terminal, thereby adjusting the current flowing through itself. In this example, transistor M1 can be a metal-oxide semiconductor transistor (MOSFET), but other devices can alternatively or additionally be used as controlled current source (e.g., a bipolar junction transistor [BJT]). A non-inverting input terminal of operational amplifier OP can receive dimming voltage Vd, and an inverting input terminal can be coupled to voltage dividing input terminal "i." Thus, transistor M1 and operational amplifier OP may form a feedback loop. Operational amplifier OP can control output voltage Vm based on virtual short circuit characteristics between the two input terminals, such that transistor M1 can keep voltage VDIMI1 at voltage dividing input terminal "i" equal to dimming voltage Vd.

Resistor divider network 12 can include resistors R1 and R2, and adjustable resistor Rd. Resistors R1 and R2 can connect in series between voltage dividing input terminal "i" and the ground. Resistor R1 can connect between voltage dividing input terminal "i" and voltage dividing output terminal "o," and resistor R2 can connect between voltage dividing output terminal "o" and ground. Also, adjustable resistor Rd can be coupled in parallel with resistor R2. Equivalent resistor Re of the parallel circuit of the two resistors can satisfy: Re=Rd*R2/(Rd+R2). Therefore, conversion voltage VDIMI2 at voltage dividing output terminal "o" may satisfy: VDIMI2=VDIMI1*Re/(Re+R1)=Vd*Re/(Re+R1).

Since R1 and R2 are constant, equivalent resistor Re can be increased by adjusting adjustable resistor Rd under the same dimming voltage Vd, thereby adjusting conversion voltage VDIMI2. Besides, the duty cycle of PWM signal PWM generated by comparator CMP1 can be determined by conversion voltage VDIMI2, so dimming voltage Vd corresponding to the fixed range of the duty cycle (e.g., the same maximum duty ratio) can be adjustable. In this example, a relatively large dimming voltage may correspond to the large duty cycle of the PWM signal. In other applications, dimming voltage Vd can be inversely proportional to the duty cycle of the PWM signal. Therefore, the range of dimming voltage Vd can be adjusted by adjusting adjustable resistor Rd in an opposite way.

In this particular example, voltage following circuit 11, resistors R1 and R2, and comparator CMP1 of signal conversion circuit 1' can all be integrated in an integrated circuit. Further, voltage dividing output terminal "o" can be taken out through an adjustment pin of the integrated circuit, and adjustable resistor Rd can be set as an external component to be coupled between the adjustment pin and the ground. In this way, signal conversion circuit 1' of particular embodiments can be conveniently made.

In an alternative implementation, adjustable resistor Rd can also be coupled in parallel with resistor R1; that is, adjustable resistor Rd can be coupled between voltage dividing input terminal "i" and voltage dividing output terminal "o." Thus, adjusting adjustable resistor Rd can also make the voltage division ratio of resistor divider network adjustable, thereby realizing the adjustment of the range of dimming voltage Vd. When the main portion of signal conversion circuit 1' is formed as the integrated circuit, voltage dividing input terminal "i" and voltage dividing output terminal "o" may be taken out through two different adjustment pins of the integrated circuit. Also, adjustable resistor Rd can be coupled between the two adjustment pins.

Figure 6:
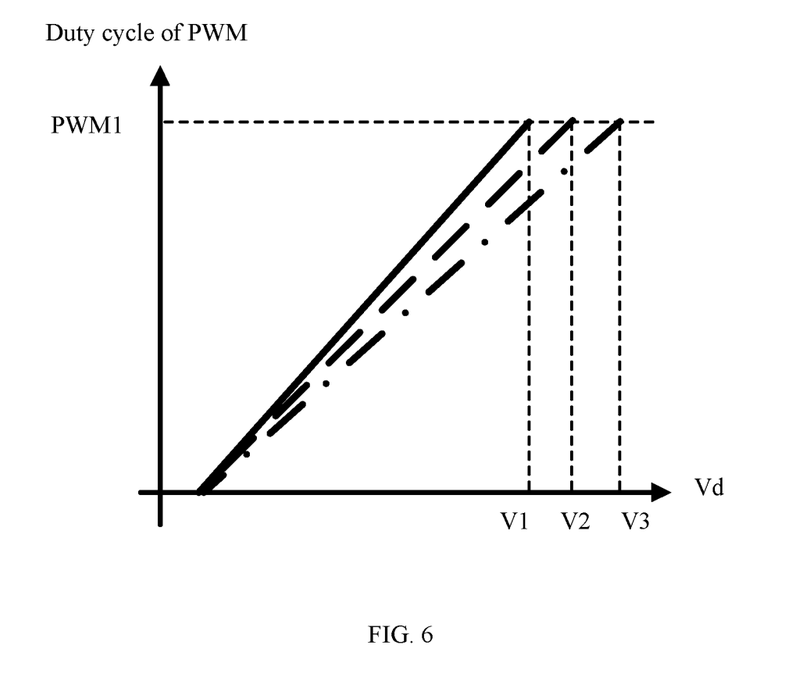
FIG. 6 is a schematic block diagram of example signal relationship of the example signal conversion circuit, in accordance with embodiments of the present invention.

Referring now to FIG. 6, shown is a schematic block diagram of an example signal relationship of the example signal conversion circuit, in accordance with embodiments of the present invention. In this example, different dimming voltages V1-V3 can correspond to the same PWM signal with the same range of duty cycle (e.g., with maximum duty cycle PWM1) by adjusting the corresponding relationship between dimming voltage Vd and the duty cycle of the PWM signal.

Figure 7:
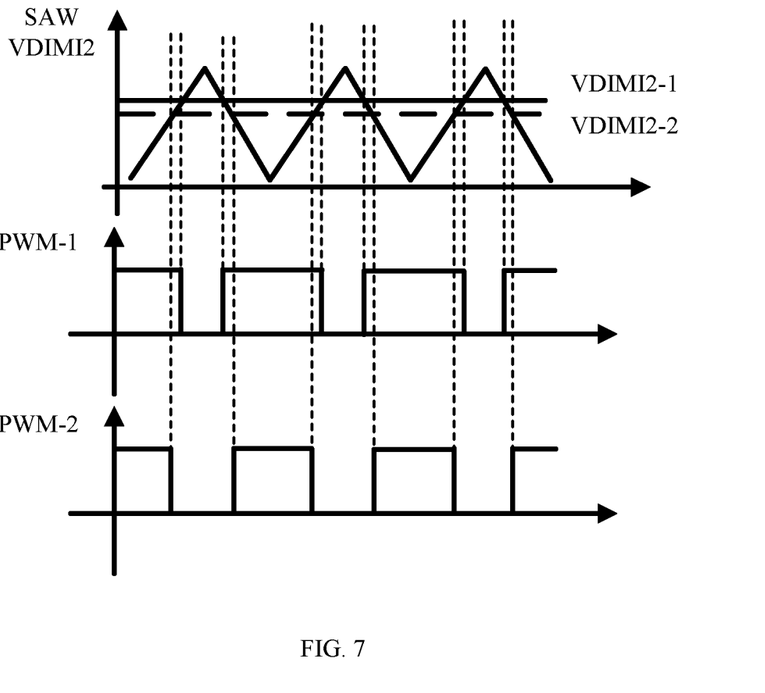
FIG. 7 is a waveform diagram of example operation of the example signal conversion circuit, in accordance with embodiments of the present invention.

Referring now to FIG. 7, shown is a waveform diagram of example operation of the example signal conversion circuit, in accordance with embodiments of the present invention. In this example, when the resistance of adjustable resistor Rd is Rd1, the voltage at voltage dividing output terminal "o" is VDIMI2-1, and the PWM signal generated by comparator CMP1 is PWM-1. When the resistance of adjustable resistor Rd is Rd2, the voltage at voltage dividing output terminal "o" is VDIMI2-2, and the PWM signal generated by comparator CMP1 is PWM-2. Since Rd1>Rd2, VDIMI2-1>VIDMI2-2, thereby making the duty cycle of PWM signal PWM-1 greater than the duty cycle of PWM signal PWM-2. Therefore, when the range of the duty cycle of PWM signal PWM is unchanged, different resistances of adjustable resistor Rd can correspond to different maximum dimming voltages. And in this example, the range of dimming voltage Vd can be adjusted efficiently based on the requirements, and without making any modifications to the power stage circuit.

Figure 8:
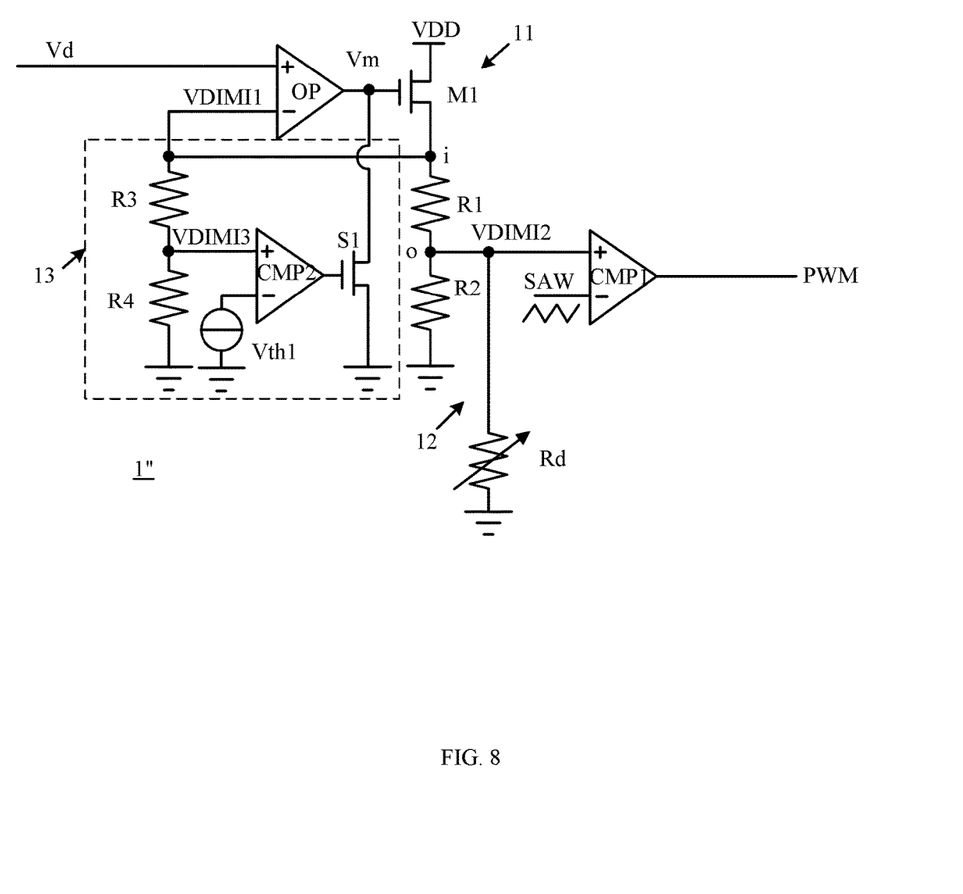
FIG. 8 is a schematic block diagram of another example signal conversion circuit, in accordance with embodiments of the present invention.

Referring now to FIG. 8, shown is a schematic block diagram of another example signal conversion circuit, in accordance with embodiments of the present invention. In this particular example, signal conversion circuit 1" can be configured to adjust the ratio of dimming voltage Vd to the duty cycle of the PWM signal, such that the range of the duty cycle of PWM signal PWM can be adjustable; that is, the maximum duty cycle of the PWM signal can be adjustable. For example, signal conversion circuit 1" can adjust the maximum duty cycle of the PWM signal by adjusting the voltage division ratio of the resistor divider network. In this particular example, signal conversion circuit 1" can include voltage following circuit 11, adjustment circuit, a PWM signal generation circuit, and clamp circuit 13. Voltage following circuit 11 can be configured to keep the voltage at voltage dividing input terminal "i" proportional to dimming voltage Vd (e.g., the dimming signal).

The adjustment circuit can include resistor divider network 12, which can be coupled to voltage dividing input terminal "i," and may generate conversion voltage VDIMI2 from voltage dividing output terminal "o." Also, resistor divider network 12 can include adjustable resistor Rd to make the voltage division ratio of resistor divider network 12 adjustable, and the voltage division ratio can refer to the ratio of conversion voltage VDIMI2 at voltage dividing output terminal "o" to voltage VDIMI1 at voltage dividing input terminal "i." The PWM signal generation circuit can include comparator CMP1. The inverting input terminal of comparator CMP1 can receive sawtooth signal SAW, the non-inverting input terminal can be coupled to voltage dividing output terminal "o," and the output terminal can generate PWM signal PWM. Clamp circuit 13, coupled to voltage following circuit 11, can clamp voltage VDIMI1 at voltage dividing input terminal "i" when dimming voltage Vd satisfies a predetermined condition. In this example, the predetermined condition is that dimming voltage Vd is greater than clamp voltage Vclp that is equal to Vth1*(R3+R4)/R4, where Vth1 is a predetermined threshold characterizing that dimming voltage Vd is equal to clamp voltage Vclp.

It should be understood that, the predetermined condition may be different depending on the manner in which the circuit is arranged. For example, clamp circuit 13 can clamp when dimming voltage Vd is less than clamp voltage Vclp'. In this particular example, voltage VDIMI1 may not change with dimming voltage Vd after it is clamped at clamp voltage Vclp. Correspondingly, the duty cycle of the PWM signal generated by comparator CMP1 can be the maximum duty cycle. Also, the range of the duty cycle of the PWM signal used for dimming can be adjusted if adjustable resistor Rd of resistor divider network 12 can also be adjusted, thereby adjusting the full load current of LED driver.

For example, clamp circuit 13 can include comparator CMP2 and switch S1. A non-inverting input terminal of comparator CMP2 can receive voltage VDIMI3, which is proportional to voltage VIDIMI1 at voltage dividing input terminal "i," an inverting input terminal of comparator CMP2 can receive predetermined threshold Vth1, and an output terminal can be coupled to the control terminal of switch S1. In this example, switch S1 can be a MOSFET, but switch S1 can additionally or alternatively be other types of power controlled switching devices (e.g., triodes). Also, switch S1 can be coupled between the control terminal of transistor M1 and ground, and may be controlled by the output of comparator CMP2 to be turned on and off. When switch S1 is turned off, transistor M1 can be controlled by output voltage Vm of operational amplifier OP, and when switch S1 is turned on, the voltage at the control terminal of transistor M1 can be pulled down such that transistor M1 is turned off.

For example, voltage VDIMI3 can be acquired by another resistor divider network coupled between voltage dividing input terminal "i" and ground. The resistor divider network can include resistor R3 that is coupled between voltage dividing input terminal "i" and the non-inverting input terminal of comparator CMP2, and resistor R4 that is coupled between the non-inverting input terminal of comparator CMP2 and ground. In this particular example, when dimming voltage Vd is greater than clamp voltage Vclp that is equal to Vth1*(R3+R4)/R4, voltage VDIMI1 at voltage dividing input terminal "i" can increase to Vth1*(R3+R4)/R4. Correspondingly, voltage VDIMI3 can increase to predetermined threshold Vth1, and the output of comparator CMP2 may be high, such that switch S1 can be controlled to turn on, thereby making transistor M1 turn off. Since voltage VDIMI1 is greater than zero, there is a current flowing through resistors R1 and R2, such that voltage VDIMI1 may drop. Therefore, voltage VDIMI3 that is proportional to voltage VDIMI1 can also drop.

When voltage VDIMI3 drops below predetermined threshold Vth1, the output of comparator CMP2 can be low, such that switch S1 can be turned off, thereby making transistor M1 turn on to operate in a linear region such that the voltage at voltage dividing input terminal "i" can be pulled up. Repeatedly, voltage VDIMI1 can be clamped near clamp voltage Vclp and may not change with dimming voltage Vd. Also, conversion voltage VDIMI2 can be proportional to clamp voltage Vclp. Further, when dimming voltage Vd is less than or equal to clamp voltage Vclp, conversion voltage VDIMI2 may still be proportional to dimming voltage Vd. In order to facilitate the setting and adjustment of the parameters, resistor R1 can be set equal to resistor R3, and resistor R2 can be set equal to R4.

Figure 9:
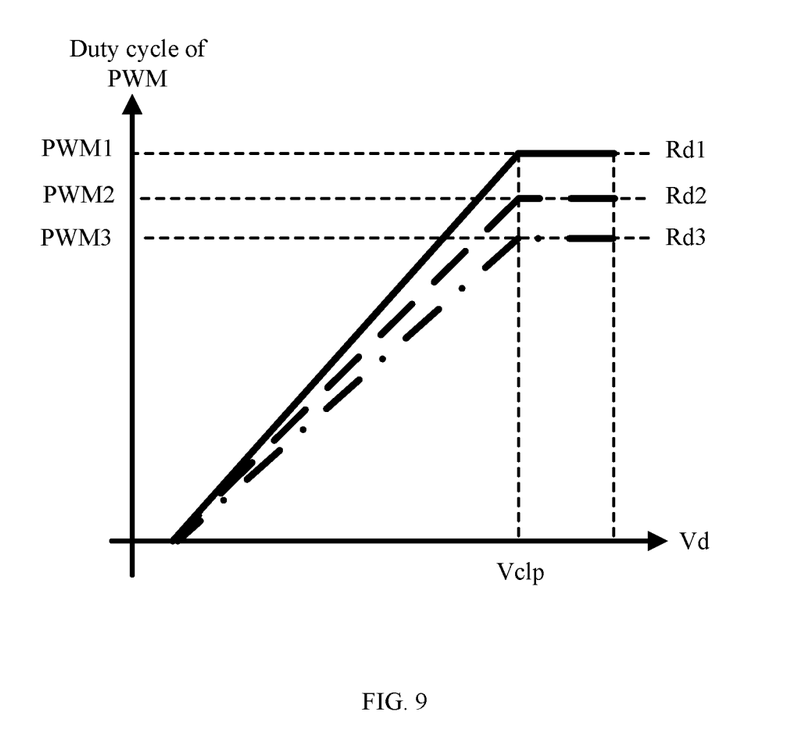
FIG. 9 is a schematic block diagram of example signal relationship of another example signal conversion circuit, in accordance with embodiments of the present invention.

Referring now to FIG. 9, shown is a schematic block diagram of an example signal relationship of another example signal conversion circuit, in accordance with embodiments of the present invention. In this example, the duty cycle of the PWM signal can vary with dimming voltage Vd in a linear relationship with different slopes corresponding to different resistances Rd1-Rd3 of adjustable resistor Rd. The greater adjustable resistor Rd is, the greater the slope of the corresponding relationship curve. When dimming voltage Vd is greater than clamp voltage Vclp, the duty cycle may not increase with dimming voltage Vd because voltage VDIMI1 at voltage dividing input terminal "i" is clamped. Different resistances of adjustable resistor Rd can correspond to different maximum duty cycles according to the same clamp voltage Vclp. Therefore, under the premise of keeping the range of dimming voltage Vd the same, different ranges of the duty cycle of PWM signal PWM can be obtained by adjustment, thereby expanding or reducing the range of the full load current of the LED driver.

According to signal conversion circuit 1" of FIG. 8, when voltage following circuit 11, resistors R1 and R2, comparator CMP1 and clamp circuit 13 can all be integrated in an integrated circuit. Voltage dividing output terminal "o" can be taken out by an adjustment pin of the integrated circuit, and adjustable resistor Rd can be set as an outside component to be coupled between the adjustment pin and the ground. In this way, signal conversion circuit 1" of particular embodiments can be conveniently made.

In an optional implementation, adjustable resistor Rd can be coupled in parallel with resistor R1; that is, adjustable resistor can be coupled between voltage dividing input terminal "i" and voltage dividing output terminal "o." The range of dimming voltage Vd can also be adjusted by adjusting adjustable resistor Rd. When main portion of signal conversion circuit 1" is formed as the integrated circuit, voltage dividing input terminal "i" and voltage dividing output terminal "o" may be taken out through two different adjustment pins of the integrated circuit, and adjustable resistor Rd can be coupled between the two adjustment pins.

In this particular example, by setting voltage conversion circuit T in signal conversion circuit 1", the ratio of the conversion voltage VDIMI2 configured to generate the PWM signal to dimming voltage Vd can be adjustable. When dimming voltage Vd is greater than the expected range, the ratio of conversion voltage VDIMI2 to clamp voltage Vclp can be adjustable, thereby making the range of corresponding duty cycle of the PWM signal adjustable when the range of dimming voltage is fixed. Thus, the output current or the primary current corresponding to the maximum duty cycle can be adjusted without modifying the parameters or devices of the power stage circuit, such that the range of the output current of the LED driver is adjustable.

Figure 10:
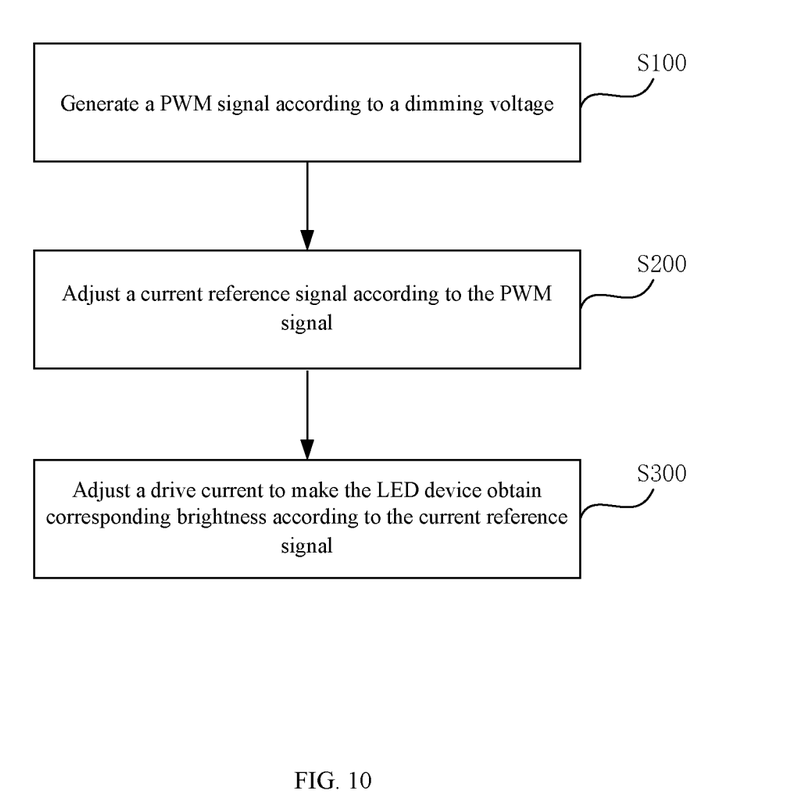
FIG. 10 is a flow diagram of an example dimming method, in accordance with embodiments of the present invention.

Referring now to FIG. 10, shown is a flow diagram of an example dimming method, in accordance with embodiments of the present invention. This example method can be used to adjust the range of the dimming voltage or the range of the duty cycle in the examples discussed above. As shown in S100, the PWM signal can be generated according to the dimming voltage. The corresponding relationship between the dimming voltage and the duty cycle of the PWM signal can be adjustable according to requirements for the brightness of LED light, in order to generate the drive current of the LED driver. When the expected range of the dimming voltage is adjustable, the range of the duty cycle is fixed. When the expected range of the dimming voltage is fixed, the range of the duty cycle is adjustable.

For example, S100 can include generating the conversion voltage according to the dimming voltage, and comparing the conversion voltage against the sawtooth signal to obtain the PWM signal. Under applications whereby the expected range of the dimming voltage is adjustable, the voltage division ratio of the resistor divider network can be adjustable, in order to make the conversion voltage proportional to the dimming voltage, such that the range of the dimming voltage can be adjustable when the maximum duty cycle of the PWM signal is fixed.

Under applications whereby the expected range of the dimming voltage is fixed, a predetermined threshold can be set, in order to characterize a clamp voltage corresponding to the maximum of the dimming voltage. When the dimming voltage is less than the clamp voltage, the conversion voltage that is proportional to the dimming voltage may be generated. When the dimming voltage is greater than the clamp voltage, the conversion voltage that is proportional to the clamp voltage can be generated. Therefore, the adjustment of the maximum duty cycle of the PWM signal can be achieved by adjusting the ratio of the conversion voltage to the clamp voltage or the dimming voltage. As shown in S200, the current reference signal can be adjusted according to the PWM signal. In S300, the drive current can be adjusted to make the LED device obtain corresponding brightness according to the current reference signal.

In an application whereby the entire range of the dimming voltage corresponds to the entire range of the duty cycle of the PWM signal (e.g., the maximum dimming voltage corresponds to the maximum duty cycle), particular embodiments can facilitate full utilization of the duty cycle. That is, whatever the dimming voltage is (e.g., 0-10V, 0-50V, etc.), the duty cycle can be adjusted based on the corresponding relationship to a range of from 0% to 100%. Dimming with a wide range or a narrow range can adjust the change speed of the brightness, and methods of particular embodiments can be employed in order to adjust the change speed of the drive current.

In an application whereby the range of the dimming voltage is limited (e.g., by the clamp circuit), the maximum dimming voltage may correspond to the maximum duty cycle, and may further correspond to the maximum drive current. By changing the corresponding relationship, the same maximum dimming voltage (e.g., 10V) can correspond to different maximum duty cycles (e.g., 80%, 100%, etc.), and may further correspond to a different maximum drive current. In this way, the drive current of the LED driver may be based on the corresponding relationship.

In particular embodiments, by adjusting the corresponding relationship between the dimming voltage and the duty cycle of the PWM signal without modifying the parameters or devices of the power stage circuit, the range of the duty cycle can be fixed when the expected range of the dimming voltage is adjustable, thereby the adjustment for the range of the dimming voltage can be achieved. Also, when the expected range of the dimming voltage is fixed, the range of the duty cycle can be adjustable, and then the output current or the primary current corresponding to the maximum duty cycle can be adjusted, such that the range of the output current of the LED driver is adjustable.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A dimming signal conversion method, comprising:
    a) converting a dimming voltage to a pulse-width modulation (PWM) signal;
    b) adjusting a corresponding relationship between said dimming voltage and a duty cycle of said PWM signal according to brightness requirements of a light-emitting diode (LED) light source, wherein said dimming voltage corresponds to different values of said duty cycle of said PWM signal; and
    c) generating a drive current of an LED driver based on said corresponding relationship.

2. The method of claim 1, wherein said adjusting said corresponding relationship is performed such that a range of said duty cycle of said PWM signal is fixed when an expected range of said dimming voltage is adjustable.

3. The method of claim 1, wherein said adjusting said corresponding relationship is performed in order to adjust a range of said duty cycle of said PWM signal when an expected range of said dimming voltage is fixed.

4. The method of claim 1, wherein said corresponding relationship between said dimming voltage and said duty cycle of said PWM signal is a linear relationship.

5. The method of claim 1, wherein said converting said dimming voltage to said PWM signal circuit comprises:
    a) generating a conversion voltage according to said dimming voltage; and
    b) comparing said conversion voltage against a sawtooth signal to generate said PWM signal.

6. The method of claim 5, wherein said generating said conversion voltage comprises adjusting a voltage division ratio of a resistor divider network.

7. The method of claim 6, wherein said adjusting said voltage division ratio of said resistor divider network is performed in order to make said conversion voltage proportional to said dimming voltage when said expected range of said dimming voltage is adjustable.

8. The method of claim 6, further comprising:
    a) setting a predetermined threshold that characterizes a clamp voltage corresponding to a maximum of said dimming voltage when said expected range of said dimming voltage is fixed; and
    b) adjusting said voltage division ratio of said resistor divider network to make said conversion voltage proportional to said dimming voltage when said dimming voltage is less than said clamp voltage, and to make said conversion voltage proportional to said clamp voltage when said dimming voltage is greater than said clamp voltage.

9. The method of claim 1, further comprising:
    a) generating a current reference signal according to said duty cycle of said PWM signal; and
    b) adjusting said drive current according to said current reference signal.

10. A signal conversion circuit for a light-emitting diode (LED) driver, the signal conversion circuit comprising:
    a) a voltage conversion circuit configured to convert a dimming voltage to a conversion voltage;
    b) a pulse-width modulation (PWM) signal generating circuit configured to receive said conversion voltage, and to generate a PWM signal; and
    c) wherein a corresponding relationship between said dimming voltage and said conversion voltage is adjustable according to brightness requirements of an LED light source, in order to generate a drive current of said LED driver, wherein said dimming voltage corresponds to different values of a duty cycle of said PWM signal.

11. The signal conversion circuit of claim 10, wherein said PWM signal generating circuit is configured to compare said conversion voltage against a sawtooth signal, in order to generate said PWM signal.

12. The signal conversion circuit of claim 10, wherein said voltage conversion circuit comprises an adjustment circuit configured to adjust said corresponding relationship between said dimming voltage and said duty cycle of said PWM signal, in order to generate said conversion voltage.

13. The signal conversion circuit of claim 10, wherein said corresponding relationship between said dimming voltage and said duty cycle of said PWM signal is a linear relationship.

14. The signal conversion circuit of claim 12, wherein said adjustment circuit comprises a resistor divider network coupled to a voltage dividing input terminal, and being configured to adjust a voltage division ratio of said resistor divider network, in order to generate said conversion voltage at a voltage dividing output terminal.

15. The signal conversion circuit of claim 14, wherein:
a) said resistor divider network comprises an adjustable resistor configured to make said voltage division ratio of said resistor divider network adjustable; and
b) said adjustable resistor is coupled to an external pin of an integrated circuit when said signal conversion circuit is formed as said integrated circuit.

16. The signal conversion circuit of claim 14, wherein:
a) said resistor divider network further comprises first and second resistors coupled in series between said voltage dividing input terminal and ground; and
b) said adjustable resistor is coupled in parallel with said first and second resistors.

17. The signal conversion circuit of claim 14, wherein:
a) said voltage conversion circuit further comprises a voltage following circuit having an input terminal receive said dimming voltage and an output terminal coupled to said voltage dividing input terminal; and
b) said voltage following circuit is configured to keep an output voltage at said output terminal proportional to said dimming voltage.

18. The signal conversion circuit of claim 17, wherein said voltage following circuit comprises:
a) a transistor coupled to said voltage dividing input terminal, and being configured to control a current flowing to said voltage dividing input terminal; and
b) an operational amplifier having a first input terminal configured to receive said dimming voltage, a second input terminal coupled to said voltage dividing input terminal, and an output terminal coupled to a control terminal of said transistor.

19. The signal conversion circuit of claim 10, further comprising a clamp circuit configured to adjust a range of said duty cycle of said PWM signal when an expected range of said dimming voltage is fixed.

20. The signal conversion circuit of claim 19, wherein:
a) said clamp circuit is configured to generate a clamp voltage;
b) said conversion voltage is proportional to said dimming voltage when said dimming voltage is less than said clamp voltage; and
c) said conversion voltage is proportional to said clamp voltage when said dimming voltage is greater than said clamp voltage.

* * * * *